United States Patent
Kajiwara et al.

(10) Patent No.: US 8,338,043 B2
(45) Date of Patent: Dec. 25, 2012

(54) FUEL CELL SYSTEM

(75) Inventors: Shigeto Kajiwara, Okazaki (JP);
Tomonori Imamura, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 678 days.

(21) Appl. No.: 12/526,188

(22) PCT Filed: Feb. 14, 2008

(86) PCT No.: PCT/JP2008/052907
§ 371 (c)(1),
(2), (4) Date: Aug. 6, 2009

(87) PCT Pub. No.: WO2008/099962
PCT Pub. Date: Aug. 21, 2008

(65) Prior Publication Data
US 2010/0261082 A1    Oct. 14, 2010

(30) Foreign Application Priority Data

Feb. 14, 2007   (JP) .............................. 2007-034042

(51) Int. Cl.
*H01M 8/04* (2006.01)
(52) U.S. Cl. ....................................... 429/430; 429/442
(58) Field of Classification Search .................... 429/430
See application file for complete search history.

(56) References Cited

U.S. PATENT DOCUMENTS

| | | | | |
|---|---|---|---|---|
| 2002/0192520 A1* | 12/2002 | Nonobe | | 429/23 |
| 2003/0232226 A1 | 12/2003 | Morishima et al. | | |
| 2006/0115699 A1* | 6/2006 | Matsuoka | | 429/24 |

FOREIGN PATENT DOCUMENTS

| JP | 2002-246053 A | 8/2002 |
|---|---|---|
| JP | 2004-111196 A | 4/2004 |
| JP | 2004-192852 A | 7/2004 |
| JP | 2006-147336 A | 6/2006 |
| JP | 2006-172935 A | 6/2006 |
| JP | 2006-202543 A | 8/2006 |
| JP | 2006-324066 A | 11/2006 |
| JP | 2006-339072 A | 12/2006 |

* cited by examiner

*Primary Examiner* — Patrick Ryan
*Assistant Examiner* — Brent Thomas
(74) *Attorney, Agent, or Firm* — Kenyon & Kenyon LLP

(57) ABSTRACT

Provided is a fuel cell system which can accurately detect the water state of a fuel cell to appropriately control the water content of the fuel cell. Based on an FC outlet temperature detected by a temperature sensor, an FC outlet temperature change speed detection unit detects an FC outlet temperature change speed for a unit time. If the FC outlet temperature change speed detection unit judges that the detected FC outlet temperature change speed is lower than a change speed reference value stored in a memory, an impedance measurement instruction is transmitted to an impedance calculation unit. On receiving the impedance measurement instruction from the FC outlet temperature change speed detection unit, the impedance calculation unit performs the impedance measurement for the second time. In consequence, it is possible to realize such scavenging control as to keep the water content of a fuel cell at an appropriate level by the minimum number of impedance measurement times (e.g., twice).

9 Claims, 5 Drawing Sheets

FUEL CELL SYSTEM

This is a 371 national phase application of PCT/JP2008/052907 filed 14 Feb. 2008, which claims priority to Japanese Patent Application No. 2007-034042 filed 14 Feb. 2007, the contents of which are incorporated herein by reference.

TECHNICAL FIELD

The present invention relates to a fuel cell system.

BACKGROUND ART

When an external temperature is low, there occurs a problem that water generated in a fuel cell system freezes after the stop of the system, to break down pipes, valves and the like, and in view of such a problem, a method is suggested in which a scavenging process is executed to discharge remaining water externally from a fuel cell at the stop of the system.

However, in a case where the scavenging process is performed every time at the stop of the system, the inherently unnecessary scavenging process is performed to dry the fuel cell more than necessary, which causes a problem that startup properties deteriorate all the more.

In view of such a problem, a method is suggested in which when the operation of the fuel cell system is stopped, the impedance of the fuel cell is measured to detect the water state of the fuel cell (i.e., the dry state of an electrolyte membrane), thereby controlling the scavenging process based on a detection result (e.g. see Patent Document 1).
[Patent Document 1] Japanese Patent Application Laid-Open No. 2002-246053

DISCLOSURE OF THE INVENTION

Here, a fuel gas is necessary for measuring the impedance of a fuel cell, but when a stop command is input into the system, the supply of the fuel gas to the fuel cell is stopped, and the use of the fuel gas necessary for measuring the impedance is restricted. Therefore, the water state of the fuel cell needs to be accurately detected while decreasing the number of impedance measurement times as much as possible (or without measuring any impedance), but a system for realizing such a method has not been suggested yet.

The present invention has been developed in view of the above situation, and an object thereof is to provide a fuel cell system which can accurately detect the water state of a fuel cell to appropriately control the water content of the fuel cell.

To achieve the above object, a fuel cell system according to the present invention is characterized by comprising change amount detection means for detecting the change amount of a concerned temperature of a fuel cell; storage means for storing a change amount reference value; and water state detection means for detecting the water state of the fuel cell based on the result of comparison between the change amount of the concerned temperature and the change amount reference value.

According to such a constitution, since the water state of the fuel cell is detected based on the result of the comparison between the change amount of the concerned temperature of the fuel cell and the preset change amount reference value, the water state of the fuel cell can be grasped without repeating the impedance measurement. Therefore, it is possible to realize such control as to keep the water content of the fuel cell at an appropriate level by the minimum number of impedance measurement times (e.g., twice).

Moreover, the fuel cell system according to the present invention is a fuel cell system which is provided with measurement means for measuring the impedance of a fuel cell, characterized by comprising: a memory which stores the impedance of the fuel cell at the start of a scavenging process; a concerned temperature sensor which detects a concerned temperature of the fuel cell after the start of the scavenging process; detection means for detecting the change amount of the concerned temperature per unit time; first storage means which stores a change amount reference value; judgment means for judging whether or not to measure the impedance of the fuel cell, based on the result of comparison between the change amount of the concerned temperature and the change amount reference value; second storage means for storing an impedance reference value; and scavenging control means for controlling the scavenging process based on the result of comparison between a measured impedance and the impedance reference value when the measurement means measures the impedance of the fuel cell.

Here, in the above constitution, the scavenging control means preferably judges whether to end or continue the scavenging process, based on the result of the comparison between the measured impedance and the impedance reference value, to perform control in accordance with the result of the judgment.

Moreover, in the above constitution, the scavenging control means preferably estimates a scavenging completion time by use of the impedance of the fuel cell at the start of the scavenging process stored in the memory and the impedance measured by the measurement means, when the scavenging control means judges that the scavenging process is continued, and the scavenging control means ends the scavenging process after the elapse of the estimated scavenging completion time.

Furthermore, in the above constitution, the fuel cell system further comprises an outside air temperature sensor which detects an outside air temperature, and correction means for correcting the change amount reference value in accordance with the outside air temperature detected by the outside air temperature sensor, and the judgment means preferably judges whether or not to measure the impedance of the fuel cell, based on the result of comparison between the corrected change amount reference value and the change amount of the concerned temperature.

Additionally, in the above constitution, the fuel cell system further comprises correction means for correcting the change amount reference value in accordance with the concerned temperature detected by the concerned temperature sensor, and the judgment means preferably judges whether or not to measure the impedance of the fuel cell, based on the result of comparison between the corrected change amount reference value and the change amount of the concerned temperature.

Moreover, in the above constitution, the change amount of the concerned temperature is preferably the change speed of the concerned temperature, and the concerned temperature is preferably the temperature of cooling water which circulates through the fuel cell.

As described above, according to the present invention, when the water state of the fuel cell is accurately detected, the water content of the fuel cell can appropriately be controlled.

BEST MODE FOR CARRYING OUT THE INVENTION

Hereinafter, an embodiment according to the present invention will be described with reference to the drawings.

A. Present Embodiment

<Whole Constitution>

Figure 1:
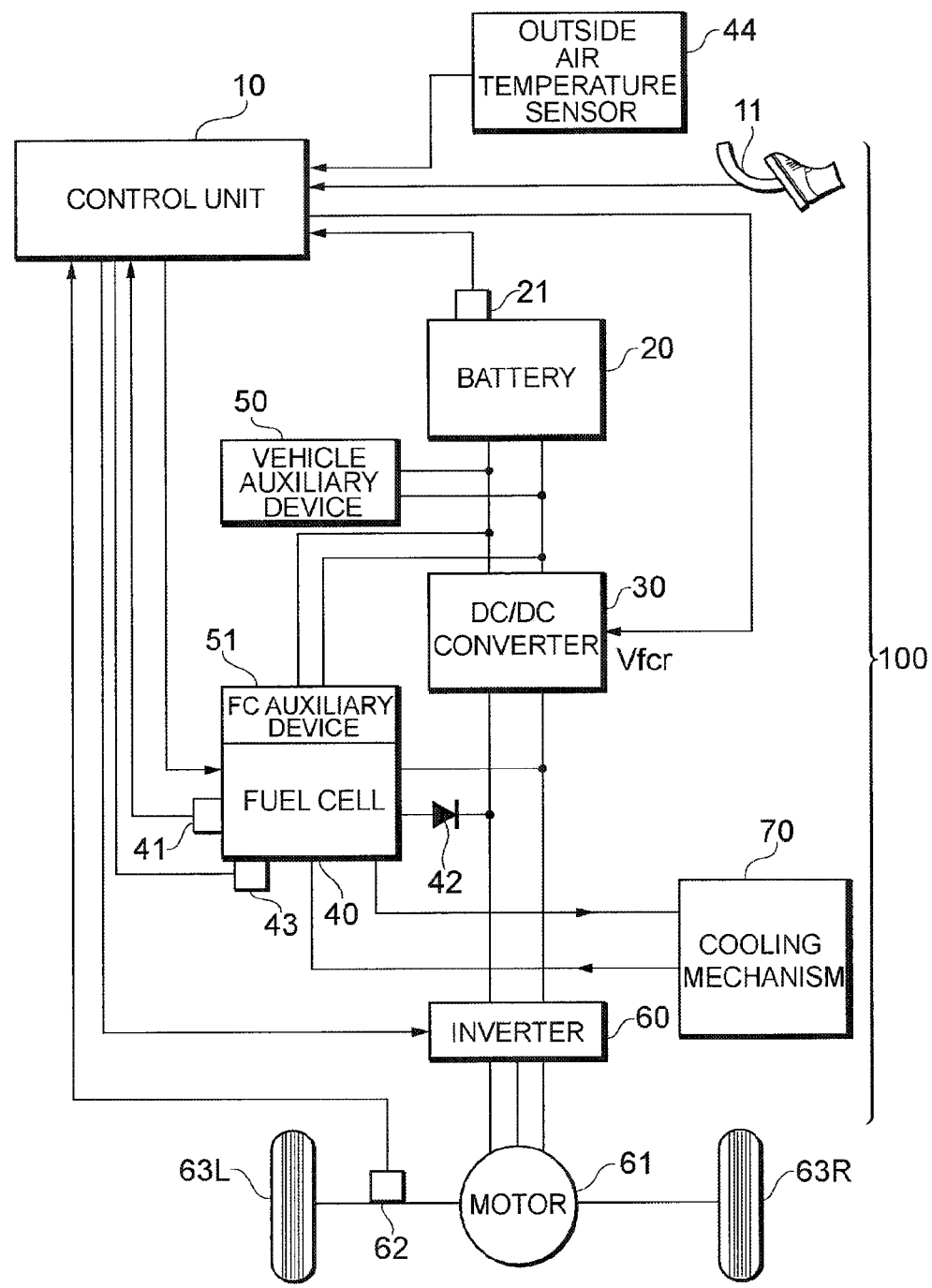
FIG. 1 is a diagram showing a constitution of a fuel cell system according to the present embodiment.

FIG. 1 shows a schematic constitution of a vehicle in which a fuel cell system 100 according to the present embodiment is mounted. It is to be noted that in the following description, a fuel cell hybrid vehicle (FCHV) is assumed as one example of the vehicle, but the present invention is applicable to an electric car or a hybrid car. Moreover, the present invention is applicable to not only the vehicle but also various mobile bodies (e.g., a ship, an airplane, a robot, etc.).

This vehicle runs by using, as a driving force source, a synchronous motor 61 connected to wheels 63L, 63R. Power sources of the synchronous motor 61 are a fuel cell 40 and a battery 20. Powers output from these fuel cell 40 and battery 20 are converted into a three-phase alternate current by an inverter 60, and supplied to the synchronous motor 61. The synchronous motor 61 can also function as a power generator during braking.

The fuel cell 40 is means for generating the power from a supplied fuel gas and oxidizing gas, and has a stack structure in which a plurality of unitary cells are stacked in series, each unitary cell being provided with an MEA including an electrolyte membrane. Specifically, fuel cells of various types such as a solid polymer type, a phosphoric acid type, and a dissolving carbonate type may be used.

A cooling mechanism 70 is a device which cools the fuel cell 40, and includes a pump which pressurizes and circulates cooling water, a heat exchanger which radiates the heat of the cooling water to the outside (they are not shown) and the like.

The fuel cell 40 is provided with a flow rate sensor 41 which detects the flow rate of each gas to be supplied, and a temperature sensor (a concerned temperature sensor) 43 which detects the temperature (the FC outlet temperature) of the cooling water on the side of the fuel cell. It is to be noted that in the present embodiment, the FC outlet temperature is assumed, but a sensor of any temperature may be used as long as a concerned temperature of the fuel cell 40 (the concerned temperature), for example, the temperature of a component around the fuel cell or the like can be detected.

The battery 20 is a chargeable/dischargeable secondary cell, and is constituted of, for example, a nickel hydrogen battery or the like. Alternatively, various types of secondary cells may be applied. Moreover, instead of the battery 20, a chargeable/dischargeable accumulator other than the secondary cell, for example, a capacitor may be used. This battery 20 is interposed in a discharge path of the fuel cell 40, and is disposed in parallel with the fuel cell 40.

The fuel cell 40 and the battery 20 are disposed in parallel with the inverter 60, and a circuit from the fuel cell 40 to the inverter 60 is provided with a diode 42 which prevents the counter flow of a current from the battery 20 or a current generated by the synchronous motor 61.

Thus, for a purpose of realizing the appropriate output distribution of both the power sources, that is, the fuel cell 40 and the battery 20 disposed in parallel, a relative voltage difference between both the power sources needs to be controlled. A DC/DC converter 30 for controlling such a voltage difference is provided between the battery 20 and the inverter 60. The DC/DC converter 30 is a direct-current voltage converter, and has a function of regulating a DC voltage input from the battery 20 to output the same to a fuel cell 40 side and a function of regulating a DC voltage input from the fuel cell 40 or the motor 61 to output the same to a battery 20 side.

A vehicle auxiliary device 50 and an FC auxiliary device 51 are interposed between the battery 20 and the DC/DC converter 30, and the battery 20 is a power source for these auxiliary devices. Examples of the vehicle auxiliary device 50 are various power devices for use during the running of the vehicle and the like, and include an illumination device, an air conditioning device, and a hydraulic pump. Moreover, examples of the FC auxiliary device 51 are various power devices for use during the operation of the fuel cell 40, and include a pump which supplies a fuel gas or a reforming material, and a heater which regulates the temperature of a reformer.

The operations of the above elements are controlled by a control unit 10. The control unit 10 has the constitution of a microcomputer in which a CPU, an RAM, an ROM and the like are incorporated. The control unit 10 controls the switching of the inverter 60 to output the three-phase alternate current to the synchronous motor 61 in accordance with a demanded power. Moreover, the control unit 10 controls the operations of the fuel cell 40 and the DC/DC converter 30 so as to supply a power corresponding to the demanded power. Various sensor signals are input into the control unit 10. Various sensor signals are input into the control unit 10 from, for example, an accelerator pedal sensor 11, an SOC sensor 21 which detects the state of charge (SOC) of the battery 20, the flow rate sensor 41, the temperature sensor 43, an outside air temperature sensor 44 which detects an outside air temperature, a vehicle speed sensor 62 which detects a vehicle speed and the like.

In the present embodiment, the change speed of the FC outlet temperature is obtained by using various input sensor signals, and the water state of the fuel cell 40 is detected from the obtained change speed of the FC outlet temperature. In consequence, such scavenging control as to keep the water content of the fuel cell 40 at an appropriate level is realized by the minimum number of impedance measurement times (e.g., twice). Hereinafter, a scavenging control function according to the present embodiment will be described.

<Description of Scavenging Control Function>

Figure 2:
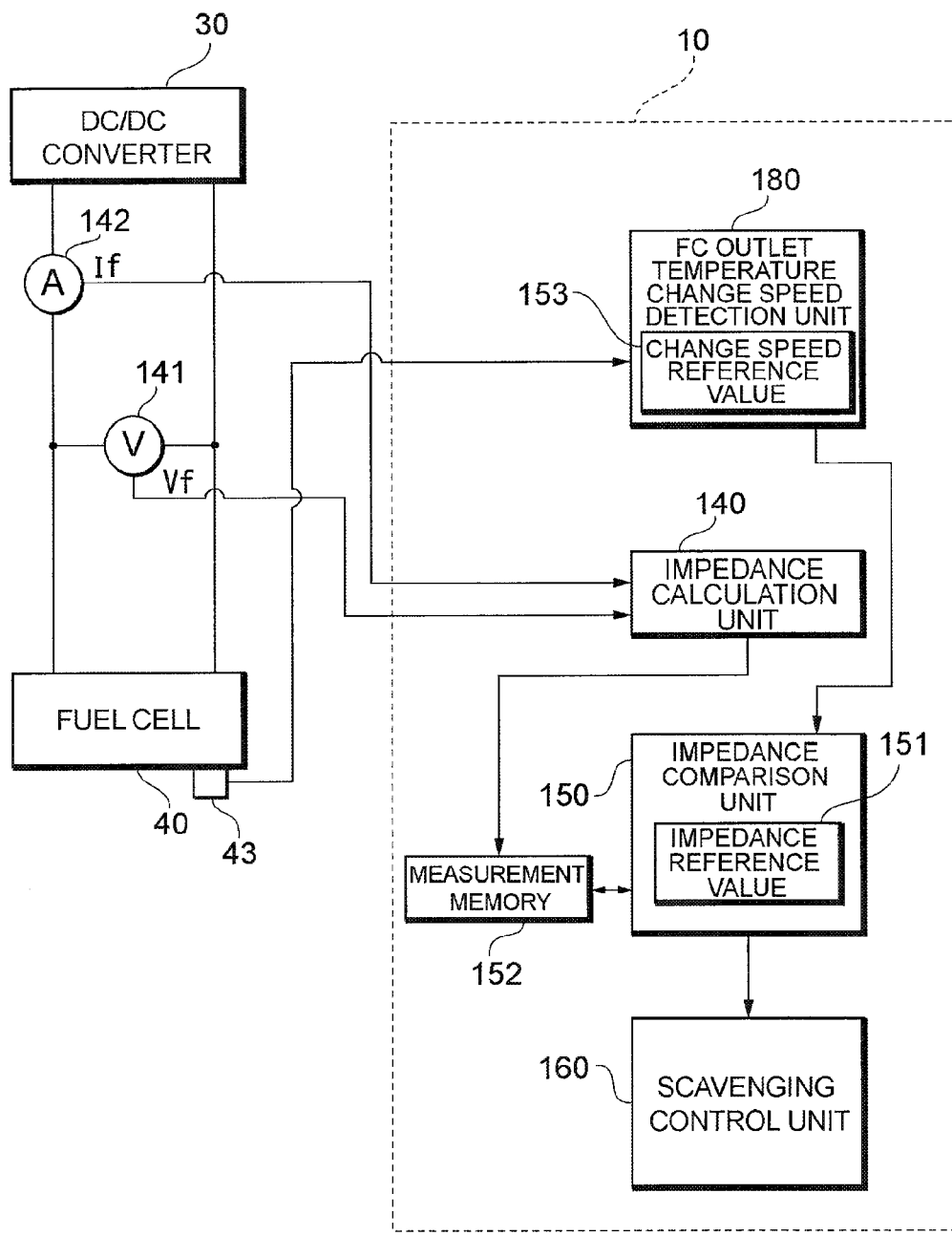
FIG. 2 is a diagram for explaining the scavenging control function of a control unit according to the embodiment.

FIG. 2 is a diagram for explaining the scavenging control function of the control unit 10.

As shown in FIG. 2, the control unit 10 includes an impedance calculation unit 140, an impedance comparison unit 150, a scavenging control unit 160, and an FC outlet temperature change speed detection unit 180.

Figure 3A:
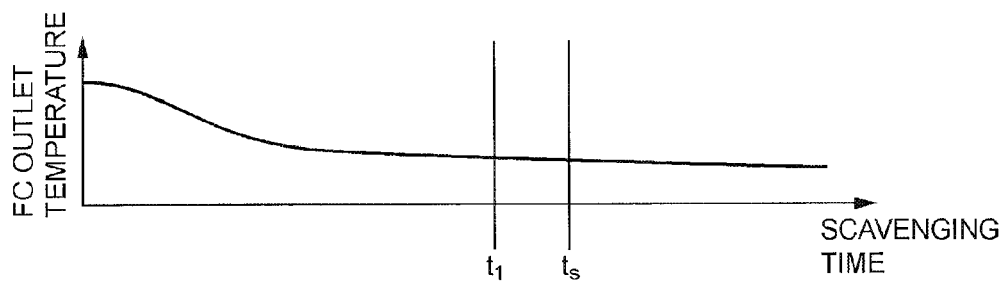
FIG. 3A is a diagram illustrating a relation between a scavenging time and an FC outlet temperature according to the embodiment.
Figure 3B:
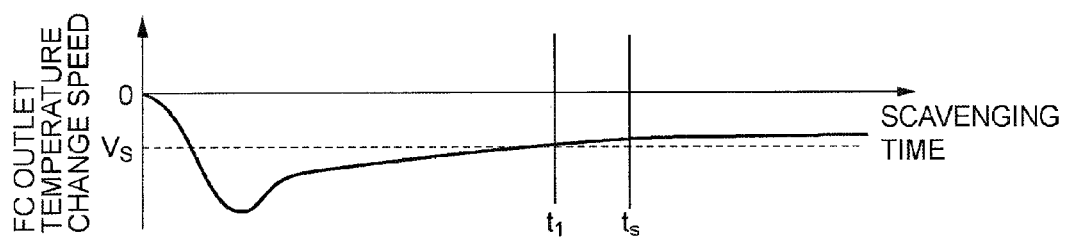
FIG. 3B is a diagram illustrating a relation between the scavenging time and an FC outlet temperature change speed according to the embodiment.
Figure 3C:
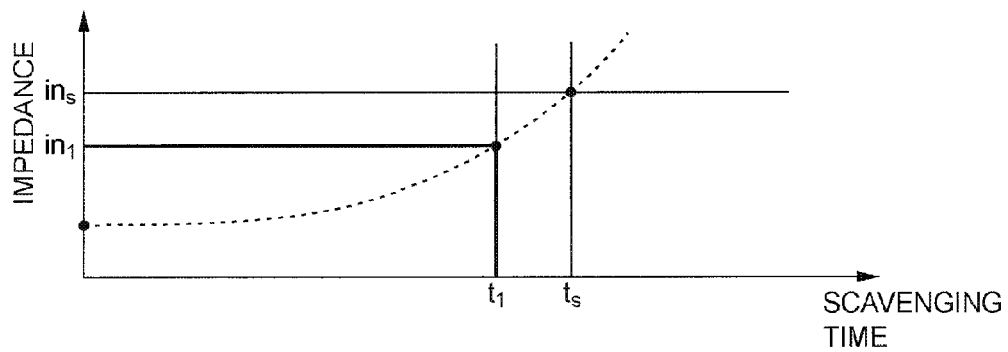
FIG. 3C is a diagram illustrating a relation between the scavenging time and a measured impedance according to the embodiment.

When the stop command of the system is input, the impedance calculation unit (measurement means) 140 performs first impedance measurement, and stores, in a measurement memory 152, a pair of an impedance (the first measured impedance) immediately before the start of a scavenging process and a scavenging time ((t, in)=(t0, in0) shown in FIG. 3C). On the other hand, the scavenging control unit (scavenging control means) 160 starts the scavenging process by use of the input of the stop command of the system as a trigger. Afterward, on receiving an impedance measurement instruction from the FC outlet temperature change speed detection unit 180, the impedance calculation unit 140 performs second impedance measurement, and stores, in the measurement memory 152, a pair of a second measured impedance as a measurement result and the scavenging time ((t, in)=(t1, in1) shown in FIG. 3C). Then, the impedance calculation unit 140 transmits an impedance comparison instruction to the impedance comparison unit 150 (details will be described later).

The FC outlet temperature change speed detection unit (change amount detection means, detection means) 180 detects the change speed (hereinafter referred to as the FC outlet temperature change speed) of the FC outlet temperature for a unit time based on the FC outlet temperature detected by the temperature sensor 43 by use of the input of the stop command of the system as the trigger.

FIG. 3A is a diagram illustrating a relation between the scavenging time and the FC outlet temperature, FIG. 3B is a diagram illustrating a relation between the scavenging time and the FC outlet temperature change speed, and FIG. 3C is a diagram illustrating a relation between the scavenging time and the measured impedance, respectively.

As apparent from comparison between FIG. 3A and FIG. 3B, when the scavenging time lengthens, the FC outlet temperature gradually lowers, whereas the absolute value of the FC outlet temperature change speed once increases and then gradually decreases. The FC outlet temperature change speed detection unit 180 judges whether or not the detected FC outlet temperature change speed is lower than a change speed reference value Vs (a change amount reference value; see FIG. 3B) stored in the memory (first storage means) 153. This change speed reference value is a reference value for judging whether or not the water content of the fuel cell 40 comes close to an appropriate value, and is obtained by an experiment or the like in advance. On judging that the detected FC outlet temperature change speed is lower than the change speed reference value (see a scavenging time t1 shown in FIG. 3B), the FC outlet temperature change speed detection unit 180 transmits the impedance measurement instruction to the impedance calculation unit 140.

On receiving the impedance measurement instruction from the impedance calculation unit 140, the impedance comparison unit (water state detection means, judgment means) 150 refers to an impedance reference value (a scavenging completion target impedance) stored in a memory (second storage means) 151. The impedance reference value is a reference value provided so that the water content of the fuel cell 40 does not excessively decrease (i.e., so that the electrolyte membrane does not excessively dry), and is obtained by an experiment or the like in advance.

Then, the impedance comparison unit 150 compares the second measured impedance (the measured impedance) stored in the measurement memory 152 with the impedance reference value stored in the memory 151. Then, the impedance comparison unit 150 judges whether or not the second measured impedance exceeds the impedance reference value. When the second measured impedance exceeds the impedance reference value, the impedance comparison unit 150 notifies the scavenging control unit 160 of the effect that the scavenging process should be ended.

On the other hand, when the measured impedance is lower than the impedance reference value, the impedance comparison unit (scavenging control means) 150 estimates a scavenging completion time as follows. Specifically, the impedance comparison unit 150 substitutes a first measured impedance in0, a second measured impedance in1, an impedance reference value ins and the scavenging time t1 of the first measured impedance into the following equation (1), to estimate a scavenging completion time ts ((t, in)=(ts, ins) shown in FIG. 3C). Afterward, on judging that the estimated scavenging completion time has elapsed, the impedance comparison unit 150 notifies the scavenging control unit 160 of the effect that the scavenging process should be ended. It is to be noted that in the present embodiment, the change of the measured impedance with an elapse of time is assumed as a quadratic function ($y=at^2+in0$), but an arbitrary function such as an exponential function may be used.

$$ts = \sqrt{\frac{ins - in0}{in1 - in0}} \, t1 \qquad (1)$$

The scavenging control unit (scavenging control means) 160 starts the scavenging process by use of the input of the stop command of the system as the trigger, and ends the scavenging process in accordance with the notification from the impedance comparison unit 150. The specific control of the scavenging process is realized by regulating the supply amount of the oxidizing gas to be supplied to the fuel cell 40, the valve open degree of a bypass valve (not shown) or the like. According to the above-mentioned constitution, such scavenging control as to keep the water content of the fuel cell 40 at the appropriate level can be realized by the minimum number of the impedance measurement times (e.g., twice).

Hereinafter, scavenging control processing according to the present embodiment will be described.

<Description of Operation>

Figure 4:
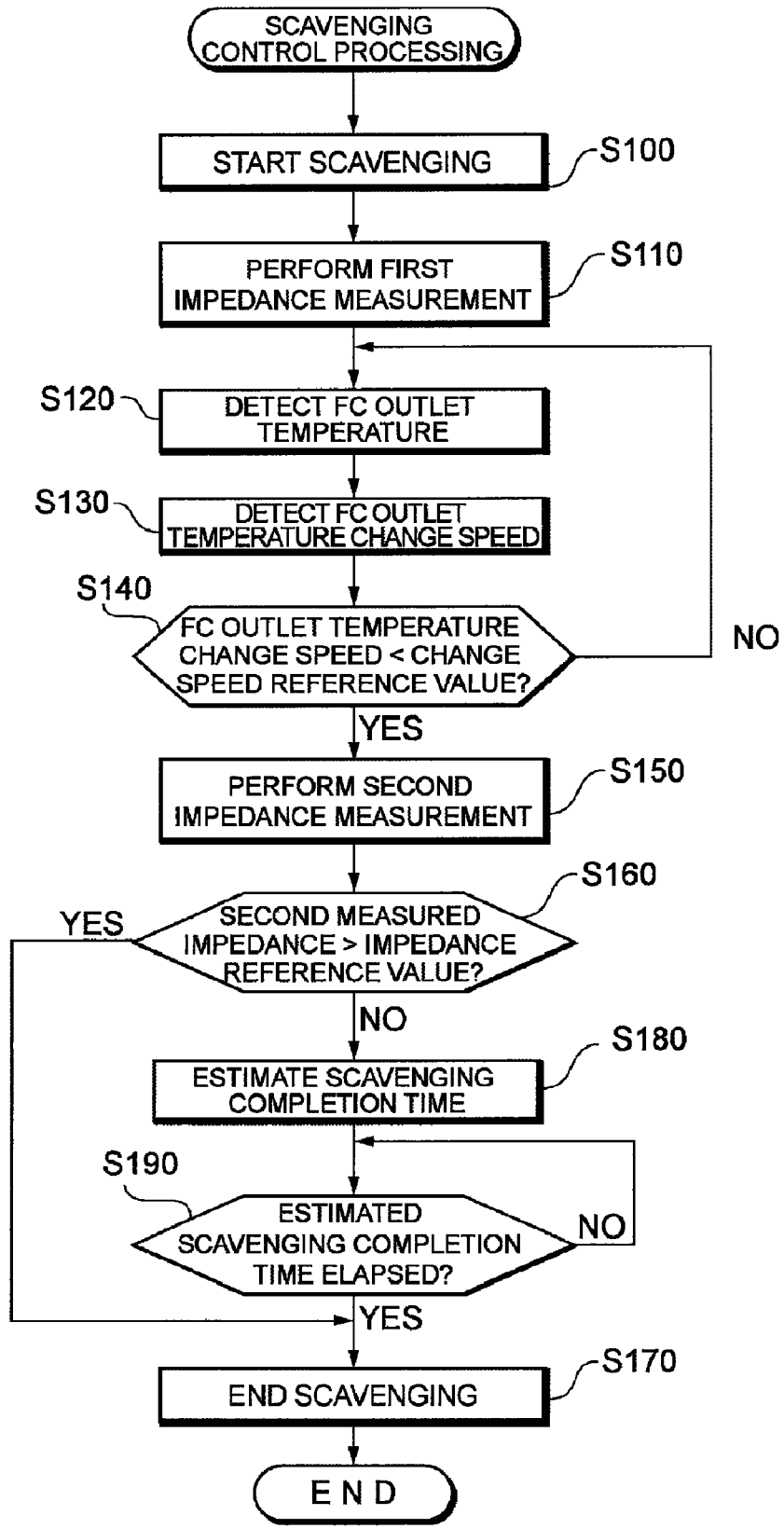
FIG. 4 is a flow chart showing scavenging control processing according to the embodiment.

FIG. 4 is a flow chart showing the scavenging control processing which is intermittently executed by the control unit 10.

When the stop command of the system is input, the scavenging control unit 160 starts the scavenging process by use of this stop command as the trigger (a step S100). On the other hand, when the stop command of the system is input, the impedance calculation unit 140 performs the first impedance measurement, and stores, in the measurement memory 152, the pair of the first measured impedance immediately before the start of the scavenging process and the scavenging time ((t, in)=(t0, in0) shown in FIG. 3C) (a step S110).

Moreover, when the stop command of the system is input, the FC outlet temperature change speed detection unit 180 detects the FC outlet temperature change speed for the unit time based on the FC outlet temperature detected by the temperature sensor 43 (a step S120→a step S130).

Then, the FC outlet temperature change speed detection unit 180 judges whether or not the detected FC outlet temperature change speed is lower than the change speed reference value stored in the memory 153 (a step S140). This change speed reference value is a reference value for judging whether or not the water content of the fuel cell 40 comes close to the appropriate value, and is obtained by the experiment or the like in advance. On judging that the detected FC outlet temperature change speed exceeds the change speed reference value, the FC outlet temperature change speed detection unit 180 returns to the step S120 to repeat the execution of the above series of processing.

On the other hand, on judging that the detected FC outlet temperature change speed is lower than the change speed reference value (see the scavenging time t1 shown in FIG. 3B), the FC outlet temperature change speed detection unit 180 transmits the impedance measurement instruction to the impedance calculation unit 140.

On receiving the impedance measurement instruction from the FC outlet temperature change speed detection unit 180, the impedance calculation unit 140 performs the second impedance measurement (a step S150), and stores, in the measurement memory 152, the pair of the second measured impedance as the measurement result and the scavenging time ((t, in)=(t1, in1) shown in FIG. 3C). Then, the impedance calculation unit 140 transmits the impedance comparison instruction to the impedance comparison unit 170.

On receiving the impedance comparison instruction from the impedance calculation unit 140, the impedance comparison unit (the judgment means) 150 compares the second measured impedance stored in the measurement memory 152 with the impedance reference value (the scavenging completion target impedance) stored in the memory 151. Then, the impedance comparison unit judges whether or not the second measured impedance exceeds the impedance reference value (a step S160).

When the measured impedance exceeds the impedance reference value, the impedance comparison unit 150 notifies the scavenging control unit 160 of the effect that the scavenging process should be ended (a step S170). The scavenging control unit 160 ends the scavenging process in accordance with the notification from the impedance comparison unit 150.

On the other hand, when the measured impedance is lower than the impedance reference value, the impedance comparison unit 150 advances to a step s180, and substitutes the first measured impedance in0, the second measured impedance in1, the impedance reference value ins and the scavenging time t1 of the first measured impedance into the above equation (1), to estimate the scavenging completion time ts ((t, in)=(ts, ins) shown in FIG. 3C).

Afterward, on judging that the estimated scavenging completion time has elapsed (a step S190; YES), the impedance comparison unit 150 notifies the scavenging control unit 160 of the effect that the scavenging process should be ended (the step S170). The scavenging control unit 160 ends the scavenging process in accordance with the notification from the impedance comparison unit 150.

As described above, according to the present embodiment, since the water state of the fuel cell is judged from the FC outlet temperature change speed, such scavenging control as to keep the water content of the fuel cell 40 at the appropriate level can be realized by the minimum number of the impedance measurement times (e.g., twice). It is to be noted that for a purpose of preventing the error of the temperature change speed, after confirming that there is not any transitional change of the FC outlet temperature or the like, the FC outlet temperature change speed or the like may be detected.

B. Modifications

<Modification 1>

An impedance reference value stored in a memory 151 may constantly be set to a constant value irrespective of a concerned temperature of a fuel cell 40 (e.g., an FC outlet temperature or the like; the FC concerned temperature), but the value may be set for each FC concerned temperature. For example, an impedance comparison unit 150 reads, from the memory 151, the impedance reference value at the FC concerned temperature, based on this temperature detected by a temperature sensor 43 or the like. Then, the impedance comparison unit 150 uses and compares the read impedance reference value with a second measured impedance. According to such a constitution, the water state of the fuel cell 40 can more accurately be judged.

<Modification 2>

Figure 5:
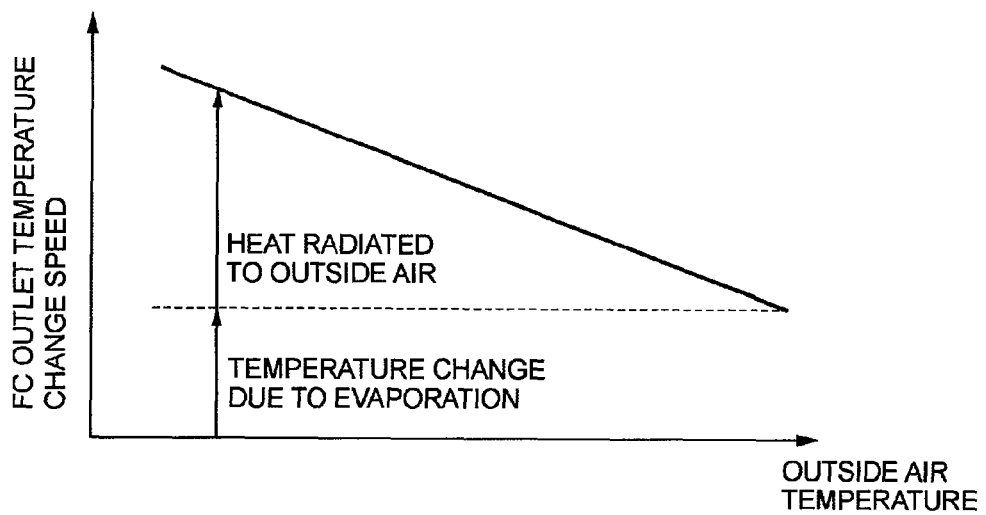
FIG. 5 is a diagram illustrating a relation between an outside air temperature and an FC outlet temperature change speed according to Modification 2.

Moreover, a change speed reference value stored in a memory 153 may be corrected in accordance with an outside air temperature. As well known, when the outside air temperature lowers, heat radiated to the outside increases, and an FC outlet temperature change speed increases (see FIG. 5). Therefore, an FC outlet temperature change speed detection unit (correction means) 180 corrects the change speed reference value in accordance with the outside air temperature detected by an outside air temperature sensor 44, and can more accurately judge the water state of a fuel cell 40 by use of the corrected change speed reference value.

<Modification 3>

Figure 6:
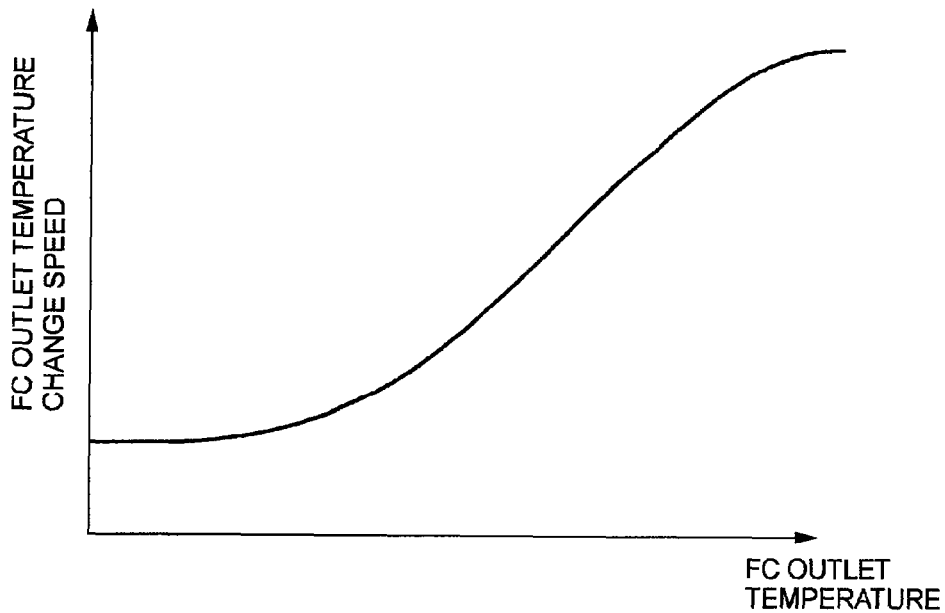
FIG. 6 is a diagram illustrating a relation between an FC outlet temperature and an FC outlet temperature change speed according to Modification 3.

Furthermore, a change speed reference value stored in a memory 153 may be corrected in accordance with an FC outlet temperature (a concerned temperature of a fuel cell). As well known, when the FC outlet temperature lowers, an evaporation speed decreases, and an FC outlet temperature change speed decreases (see FIG. 6). Therefore, an FC outlet temperature change speed detection unit (correction means) 180 corrects the change speed reference value in accordance with the FC outlet temperature detected by a temperature sensor 43, and can more accurately judge the water state of a fuel cell 40 by use of the corrected change speed reference value.

<Modification 4>

In the above embodiment, after the system stop command is input, the first impedance measurement is performed immediately before the start of the scavenging process (in the vicinity of the start of the scavenging process), but the first impedance measurement may be performed immediately after the start of the scavenging process (in the vicinity of the start of the scavenging process). Moreover, an impedance measured immediately before inputting the system stop command may be used as the first measured impedance.

<Modification 5>

In the present embodiment described above, the oxidizing gas is illustrated as a gas to be supplied to the fuel cell during the scavenging process, but the present invention is applicable to any gas such a fuel gas (hydrogen or the like) or a nitrogen gas as long as an impedance can be measured.

The invention claimed is:

1. A fuel cell system which is provided with measurement device for measuring the impedance of a fuel cell, the system comprising:
   a concerned temperature sensor which detects a concerned temperature of the fuel cell after the start of a scavenging process; and
   a control unit, the control unit comprising a first storage portion which stores a change amount reference value and a second storage portion which stores an impedance reference value, the control unit programmed to:
      detect the change amount of the concerned temperature per unit time;
      judge to measure the impedance of the fuel cell when the change amount of the concerned temperature is lower than the change amount reference value; and
      control the scavenging process based on the result of comparison between a measured impedance and the impedance reference value when the measurement device measures the impedance of the fuel cell.

2. The fuel cell system according to claim 1, the control unit further programmed to judge whether to end or continue the scavenging process, based on the result of the comparison between the measured impedance and the impedance reference value, to perform control in accordance with the result of the judgment.

3. The fuel cell system according to claim 2, wherein the control unit further comprising a memory, the control unit further programmed to store the impedance of the fuel cell in the memory at the start of a scavenging process estimate a scavenging completion time by use of the impedance of the fuel cell at the start of the scavenging process stored in the memory and the impedance measured by the measurement device, when the scavenging process is continued, and ends the scavenging process after the elapse of the estimated scavenging completion time.

4. The fuel cell system according to claim 1, further comprising:
   an outside air temperature sensor which detects an outside air temperature
   wherein the control unit further programmed to correct the change amount reference value in accordance with the outside air temperature detected by the outside air temperature sensor, and
   the control unit further programmed to judge whether or not to measure the impedance of the fuel cell, based on the result of comparison between the corrected change amount reference value and the change amount of the concerned temperature.

5. The fuel cell system according to claim 1,
   wherein the control unit further programmed to correct the change amount reference value in accordance with the concerned temperature detected by the concerned temperature sensor, and
   the control unit further programmed to judge whether or not to measure the impedance of the fuel cell, based on the result of comparison between the corrected change amount reference value and the change amount of the concerned temperature.

6. The fuel cell system according to claim 1, wherein the change amount of the concerned temperature is the change speed of the concerned temperature.

7. The fuel cell system according to claim 6, wherein the concerned temperature is the temperature of cooling water which circulates through the fuel cell.

8. A fuel cell system comprising:
   a fuel cell;
   an outside air temperature sensor which detects an outside air temperature; and
   a control unit, the control unit comprising a storage portion which stores a change amount reference value, the control unit programmed to:
   detect the change amount of a concerned temperature of a fuel cell at the stop of the system;
   correct the change amount reference value in accordance with the outside air temperature detected by the outside air temperature sensor; and
   judge to detect the water state of the fuel cell when the change amount of the concerned temperature is lower than the corrected change amount reference value.

9. A fuel cell system comprising:
   a fuel cell; and
   a control unit, the control unit comprising a storage portion which stores a change amount reference value, the control unit programmed to:
   detect the change amount of a concerned temperature of a fuel cell at the stop of the system;
   correct the change amount reference value in accordance with the concerned temperature detected; and
   judge to measure the impedance of the fuel cell when, the change amount of the concerned temperature is lower than the corrected change amount reference value.

* * * * *